Figure 1:
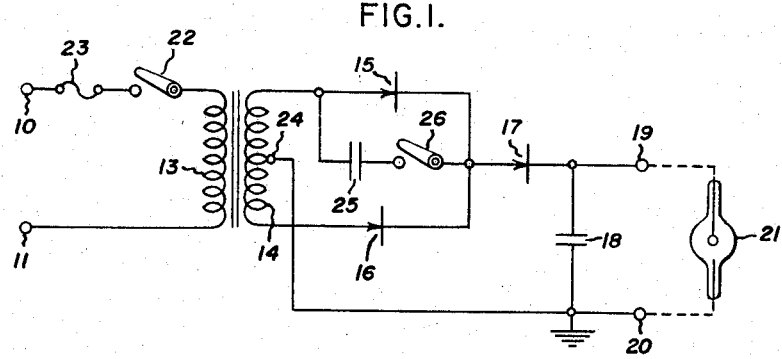

INVENTORS:
DAVID L. SWAIN,
EDWARD I. LYNCH,

BY *[signature]*
THEIR ATTORNEY.

United States Patent Office 3,354,379
Patented Nov. 21, 1967

3,354,379
RECTIFIER CIRCUIT WITH VOLTAGE MULTIPLICATION
David L. Swain, La Canada, Calif., and Edward I. Lynch, East Syracuse, N.Y., assignors to General Electric Company, a corporation of New York
Filed Jan. 26, 1966, Ser. No. 523,082
3 Claims. (Cl. 321—15)

The present invention relates to rectifier circuits, and in particular relates to rectifier circuits having predetermined voltage versus current characteristics in which the voltage drops substantially from a high voltage, no load condition to a relatively low but constant voltage, high current condition.

The need for rectifier circuits having such characteristics exists in light valve projection systems in which an arc lamp, such as of the xenon gas filled type, is used. Such lamps are used in such applications for the reason that they are small sources of high efficiency, high intensity white light. Such lamps require an initial very high voltage for a very short duration to ionize the gas in the gap thereof and thereafter require a high voltage, i.e., of the order of 80 volts for a few milliseconds to heat the electrodes thereof. The lamp can then operate from a simple high current, low voltage power supply. The high voltage, medium current requirement and the low voltage, high current requirement for the second and third phases of ignition of the lamp have hithertofore been fulfilled by separate power supplies in which high voltage supply has been switched in first, and after it has served its function, is switched out of the lamp circuit and the low voltage power supply switched in. Such rectifier circuits are described and claimed in a copending application, Serial No. 177,658, filed March 5, 1962, and assigned to the assignee of the present invention. Also a high voltage supply can be used in which a bleeder network is provided to supply the desired low voltage, high current requirement. Such prior art elements involve a large number of components, require two separate supplies, occupy appreciable space, and are relatively inefficient in the utilization of electrical power.

Accordingly an object of the present invention is to provide improvements in rectifier circuits.

An object of the present invention is to provide a simple D-C power source which has relatively constant voltage versus current characteristic in the high voltage range thereof and which has a sharply dropping voltage versus current characteristic in the low current range thereof.

Another object of the present invention is to provide a multi-purpose D-C power source, which includes a minimum of components and is simple in construction yet is highly efficient and effective in performance.

Another object of the present invention is to provide a multi-purpose D-C power source having voltage current characteristics required for the operation of gaseous discharge lamps, which is inexpensive and economical in utilization of space.

In carrying out the invention in accordance with one embodiment thereof a full wave rectifier circuit consisting of two rectifying diodes is provided. In addition, a rectifying diode connected in the load circuit of the rectifier and a small capacitance connected in shunt with one of the rectifying diodes of the full wave rectifier is provided. The capacitance is small in relation to the capacitance in shunt with the load. Such an arrangement enables a voltage approximately three times the normal full load voltage to be obtained across the load under light load or no load conditions.

Figure 2:
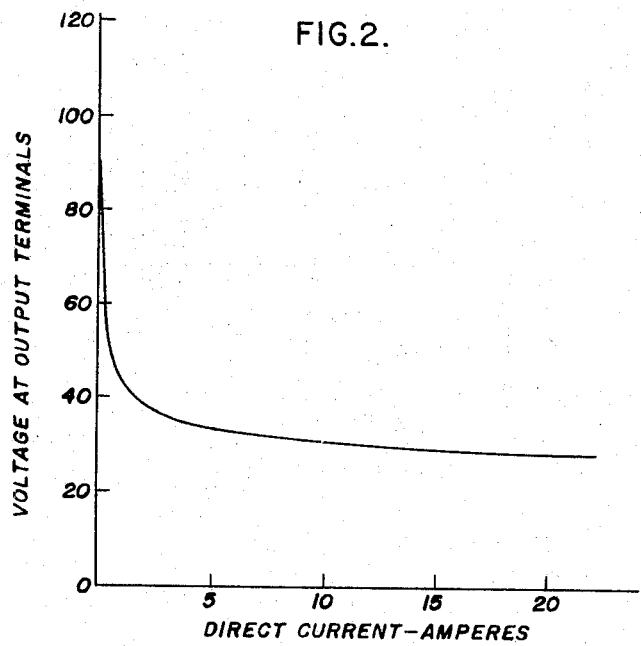

The novel features believed characteristic of the invention are set forth in the appended claims. The invention itself, together with further objects and advantages thereof, may best be understood by reference to the following description taken in connection with the following drawing in which:

FIGURE 1 is a schematic diagram of the rectifier circuit in accordance with the present invention; and FIGURE 2 is a graph of the voltage versus current characteristics of the circuit of FIGURE 1 for particular values of particular circuit elements thereof.

Referring to FIGURE 1 there is shown a rectifier circuit for converting power from an alternating source into direct current for supplying devices such as an arc lamp of the xenon gas discharge type. The rectifier circuit includes a pair of input terminals 10 and 11, an alternating current transformer 12 having a primary winding 13 and a secondary winding 14, a pair of unilaterally conducting devices or diodes 15 and 16, a third diode 17, a filter capacitor 18, and a pair of output terminals 19 and 20 to which a load such as a xenon lamp 21 may be connected. The primary winding 13 of the transformer is connected through a switch 22 and a current protective device 23, commonly referred to as a fuse, to the input terminals 10 and 11. The secondary winding 14 of the transformer has a center tap 24 which is connected to ground and a pair of terminals one of which is connected to the positively polarized terminal of diode 15 and the other of which is connected to the positively polarized terminal of diode 16. The negatively polarized terminals of the devices 15 and 16 are connected together and to the positively polarized terminal of the third diode 17. The negatively polarized terminal of the third diode 17 is connected to one electrode of the capacitor 18, the other electrode of which is connected to ground and to the output terminal 20. A small capacitor 25 is connected between the positively polarized terminal of the diode 15 and the negatively polarized terminal thereof through a switch 26. The capacitance of capacitor 25 is small in relation to the capacitance of capacitor 18.

The operation of the rectifier circuit of FIGURE 1 will be readily apparent from considering the manner in which the circuit functions over a single alternating cycle to supply electrical charge across the capacitor 18 and thence to the load 21. The circuit will be explained on the basis of switch 26 being closed. On the closing of switch 22 a voltage appears across the secondary of the transformer. Assuming that the lower end of the secondary winding 14 becomes positive with respect to the other end the capacitor 25 is charged to the peak value of the voltage appearing across the secondary winding. With the electrode of the capacitor 25 adjacent the switch 26 being positive with respect to the other electrode thereof. On the next cycle the upper end of the secondary winding 14 becomes positive with respect to the lower end. Also the charge on capacitor 25 biases diode 15 nonconductive. Accordingly, the voltage appearing across the upper half of the secondary winding adds to the voltage appearing across the capacitor 25. Thus, the voltage applied between the positive polarized terminal of the third diode 17 and ground is essentially three times the peak value of the voltage appearing across one-half the secondary winding 14. It is, of course, assumed that the time constant including the lamp and capacitance is large in relation to the time of an alternating cycle. Thus, a voltage appears across the load which is three times the peak voltage appearing across one-half of the secondary winding. Of course, as the load draws larger currents the magnitude of such voltage across the load would decrease. For very large loads the voltage appearing across the output terminals is essentially the voltage of the full wave rectifier comprising diodes 15 and 16. Essentially when the load is drawing large currents the capacitor 25 is unable to retain charge thereacross for an appreciable part of the second half cycle of the applied alternating wave of voltage. As the capacitance is unable to retain charge the diode 15 does not remain biased nonconductive for an appreciable period of the second half cycle of the alternating wave under a heavy load condition. Accordingly, the voltage is maintained at a value determined by the full wave rectifier components of the circuit. If desired, under the latter conditions the capacitor 25 may be disconnected from the circuit by means of switch 26.

FIGURE 2 shows the voltage versus current characteristic of the rectifier circuit of FIGURE 1 for particular values of capacitors thereof. Voltage is plotted along the ordinate and current is plotted along the abscissa. The peak voltage appearing across the one-half of the secondary winding of the transformer is approximately 30 volts. As can be seen from this graph the no load voltage of the rectifier is approximately three times the voltage appearing across the lamp 21 under full load and that for currents of the order of 5 amperes, the voltage drops to approximately one-third the no load voltage. Thereafter the variation of voltage with respect to current of the rectifier circuit is in accordance with the variation of voltage with current for a full wave rectifier circuit. Of course, it will be appreciated from the explanation of the operation of the circuit, that the steepness of the drop in voltage from no load to full load voltage depends on the value of the capacitance of capacitor 25. The drop in voltage would be steeper for a small value of capacitance than for large value of capacitance.

While the invention has been described in specific embodiments, it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. In combination a transformer having a primary winding and a secondary winding, a pair of unilaterally conducting devices each having a terminal of predetermined polarity and a terminal of opposite polarity, each terminal of predetermined polarity connected to a respective end of said secondary winding, and the terminals of opposite polarity connected together, a third unilaterally conducting device having a terminal of said predetermined polarity connected to the terminals of opposite polarity of said pair, a load circuit shunted by a capacitor, said load circuit connected between the terminal of opposite polarity of said third device and an intermediate point on said secondary winding, a second capacitor shunting one of said pair of unilaterally conducting devices.

2. The combination of claim 1 in which said second capacitor has a capacitance small in relation to said first capacitance.

3. In combination a transformer having a primary winding and a secondary winding, a pair of unilaterally conducting devices each having an anode and a cathode, each anode connected to a respective end of said secondary winding, and the cathodes connected together, a third unilaterally conducting device having a cathode and an anode, the anode connected to the terminals of opposite polarity of said pair, a load circuit shunted by a capacitor, said load circuit connected between the cathode of said third device and a center tap on said secondary winding, a second capacitor shunting one of said pair of unilaterally conducting devices.

References Cited

UNITED STATES PATENTS

| | | | |
|---|---|---|---|
| 2,619,602 | 11/1952 | Walker et al. | 321—15 XR |
| 2,777,107 | 1/1957 | Medlar | 321—8 |
| 3,328,666 | 6/1967 | Walbridge | 321—8 XR |

OTHER REFERENCES

D. L. Waidelich: Analyses of the Voltage-Tripling and Quadrupling Rectifier Circuits, reprinted from I.R.E. Proceedings, vol. 33, No. 7, July 1945, pp. 450-453. (Copy may be found in Group 210, Class 321, subclass 15.)

JOHN F. COUCH, *Primary Examiner.*

WM. SHOOP, *Assistant Examiner.*